(12) United States Patent
Yan et al.

(10) Patent No.: US 10,956,796 B2
(45) Date of Patent: Mar. 23, 2021

(54) SELF-GUIDED OBJECT DETECTION IN REGULAR IMAGES

(71) Applicant: INTERNATIONAL BUSINESS MACHINES CORPORATION, Armonk, NY (US)

(72) Inventors: Jun Chi Yan, Shanghai (CN); Jun Zhu, Shanghai (CN); Guo Qiang Hu, Shanghai (CN); Jing Chang Huang, Shanghai (CN); Chang Chun Liu, Shenzhen (CN); Zhi Hu Wang, Beijing (CN); Peng Ji, Nanjing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 140 days.

(21) Appl. No.: 16/157,418

(22) Filed: Oct. 11, 2018

(65) Prior Publication Data
US 2020/0117960 A1 Apr. 16, 2020

(51) Int. Cl.
*G06K 9/68* (2006.01)
*G06K 9/62* (2006.01)
*G06K 9/00* (2006.01)

(52) U.S. Cl.
CPC ......... *G06K 9/685* (2013.01); *G06K 9/00805* (2013.01); *G06K 9/6262* (2013.01)

(58) Field of Classification Search
CPC ... G06K 9/685; G06K 9/6262; G06K 9/00805
See application file for complete search history.

(56) References Cited

U.S. PATENT DOCUMENTS

| | | | |
|---|---|---|---|
| 9,858,496 B2 | 1/2018 | Sun et al. | |
| 2015/0078629 A1* | 3/2015 | Gottemukkula | G06T 11/60 382/117 |

(Continued)

FOREIGN PATENT DOCUMENTS

| | | |
|---|---|---|
| CN | 106909901 | 6/2017 |
| EP | 3171297 | 5/2017 |
| WO | WO2017079522 | 5/2017 |

OTHER PUBLICATIONS

Byeon et al. "Scene Labeling with LSTM Recurrent Neural Networks", Proceedings of the IEEE Conference on Computer Vision and Pattern Recognition (CVPR), 2015, pp. 3547-3555 (Year: 2015).*

(Continued)

*Primary Examiner* — Qian Yang
(74) *Attorney, Agent, or Firm* — Tutunjian & Bitetto, P.C.; Joseph Petrokaitis

(57) ABSTRACT

A computer-implemented method is provided for image-based, self-guided object detection. The method includes receiving, by a processor device, a set of images. Each of the images has a respective grid thereon that is labeled regarding a respective object to be detected using grid level label data. The method further includes training, by the processor device, a grid-based object detector using the grid level label data. The method also includes determining, by the processor device, a respective bounding box for the respective object in each of the images, by applying local segmentation to each of the images. The method additionally includes training, by the processor device, a Region-based Convolutional Neural Network (RCNN) for joint object localization and object classification using the respective bounding box for the respective object in each of the images as an input to the RCNN.

20 Claims, 10 Drawing Sheets

(56) References Cited

U.S. PATENT DOCUMENTS

| | | | |
|---|---|---|---|
| 2017/0286809 A1 | 10/2017 | Pankanti et al. | |
| 2018/0260651 A1* | 9/2018 | Wang | G06K 9/00791 |
| 2018/0330615 A1* | 11/2018 | Yamanaka | G08G 1/165 |
| 2019/0102646 A1* | 4/2019 | Redmon | G06K 9/4652 |
| 2019/0212749 A1* | 7/2019 | Chen | B62D 15/0255 |

OTHER PUBLICATIONS

Lu et al., "G-CNN: Object Detection via Grid Convolutional Neural Network", IEEE Access, Nov. 2017, pp. 24023-24031, vol. 5.
Ren et al., "Faster R-CNN: Towards Real-Time Object Detection with Region Proposal Networks", arXiv:1506.01497v3 [cs.CV] Jan. 6, 2016, pp. 1-14.

\* cited by examiner

SELF-GUIDED OBJECT DETECTION IN REGULAR IMAGES

BACKGROUND

Technical Field

The present invention generally relates to image processing, and more particularly to self-guided object detection in regular images.

Description of the Related Art

Visual object detection in images has ubiquitous applications such as quality inspection and so forth. Machine learning, especially deep learning based models, are dominant technology in this area. However, learning based methods requires a lot of label data. Moreover, for object detection, the label not only refers to the object category, but also the exact bounding box around the object. Hence, there is a need for an improved approach for object detection in regular images.

SUMMARY

According to an aspect of the present invention, a computer-implemented method is provided for image-based, self-guided object detection. The method includes receiving, by a processor device, a set of images. Each of the images has a respective grid thereon that is labeled regarding a respective object to be detected using grid level label data. The method further includes training, by the processor device, a grid-based object detector using the grid level label data. The method also includes determining, by the processor device, a respective bounding box for the respective object in each of the images, by applying local segmentation to each of the images. The method additionally includes training, by the processor device, a Region-based Convolutional Neural Network (RCNN) for joint object localization and object classification using the respective bounding box for the respective object in each of the images as an input to the RCNN.

According to another aspect of the present invention, a computer program product is provided for image-based, self-guided object detection. The computer program product includes a non-transitory computer readable storage medium having program instructions embodied therewith. The program instructions are executable by a computer to cause the computer to perform a method. The method includes receiving, by a processor device, a set of images. Each of the images has a respective grid thereon that is labeled regarding a respective object to be detected using grid level label data. The method further includes training, by the processor device, a grid-based object detector using the grid level label data. The method also includes determining, by the processor device, a respective bounding box for the respective object in each of the images, by applying local segmentation to each of the images. The method additionally includes training, by the processor device, a Region-based Convolutional Neural Network (RCNN) for joint object localization and object classification using the respective bounding box for the respective object in each of the images as an input to the RCNN.

According to yet another aspect of the present invention, a computer processing system is provided for image-based, self-guided object detection. The system includes a memory device for storing program code. The system further includes a processor device for running the program code to receive a set of images. Each of the images has a respective grid thereon that is labeled regarding a respective object to be detected using grid level label data. The processor device further runs the program code to train a grid-based object detector using the grid level label data. The processor device also runs the program code to determine a respective bounding box for the respective object in each of the images, by applying local segmentation to each of the images. The processor device additionally runs the program code to train a Region-based Convolutional Neural Network (RCNN) for joint object localization and object classification using the respective bounding box for the respective object in each of the images as an input to the RCNN.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to self-guided object detection in regular images.

The present invention provides a quick and efficient approach for object localization and classification.

The present invention can be used as part of a surveillance system, a face detection system, a face recognition system, a cancer detection system, an object tracking system, an Advanced Driver-Assistance System (ADAS), and so forth.

These and other applications to which the present invention can be applied as readily determined by one of ordinary skill in the art, given the teachings of the present invention provided herein, while maintaining the spirit of the present invention.

Figure 1:
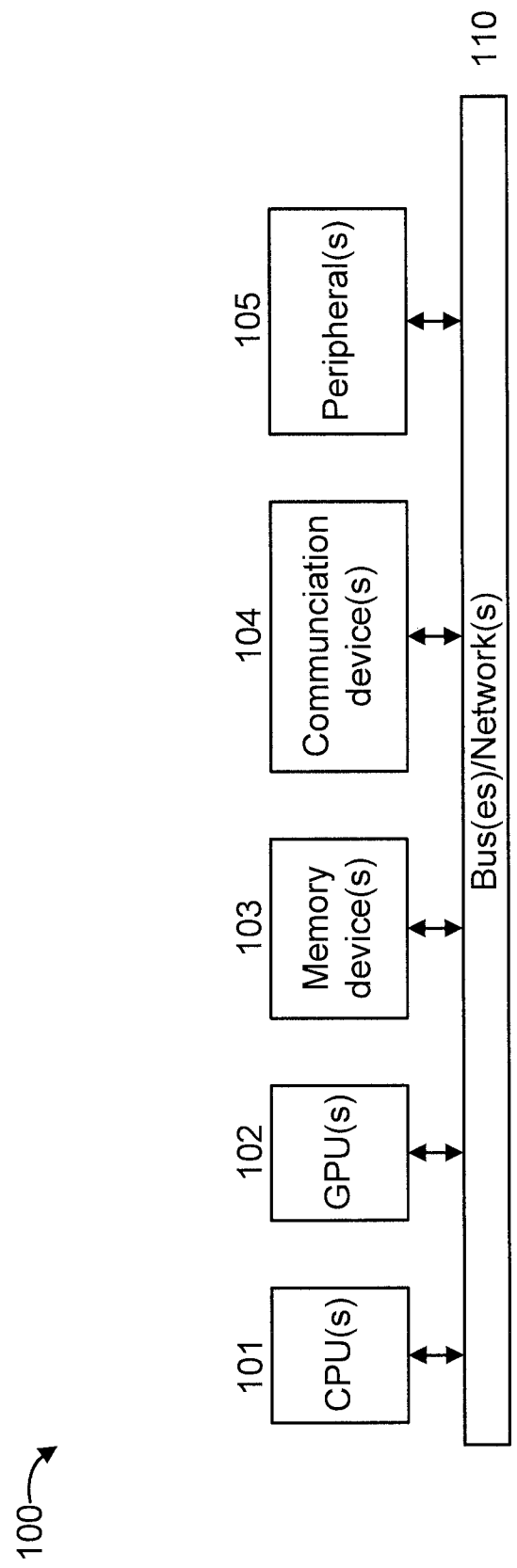
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an image device (e.g., a camera), and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 6-7). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
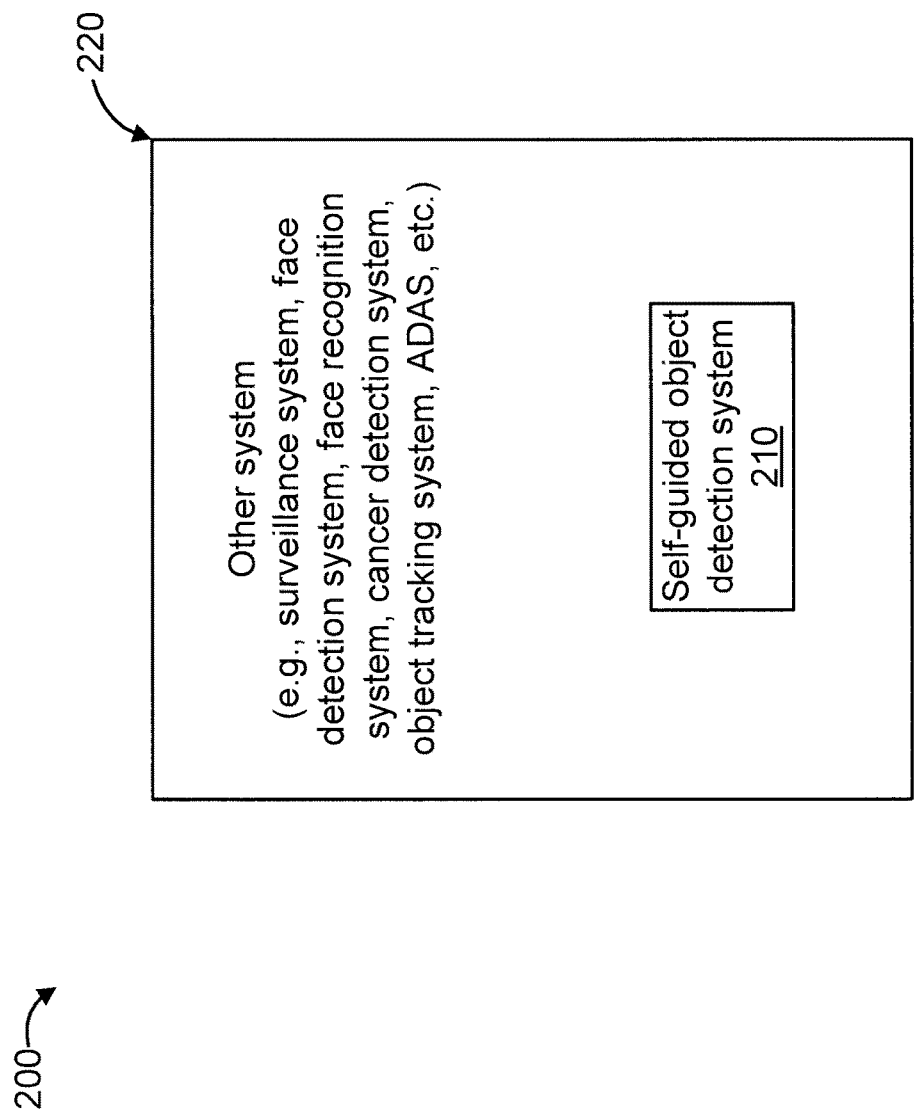
FIG. 2 is a block diagram showing an exemplary system, in accordance with an embodiment of the present invention.

FIG. 2 is a block diagram showing an exemplary system 200, in accordance with an embodiment of the present invention.

The system 200 includes a self-guided object detection system for regular images 210. The self-guided object detection system 210 is included in another system 220 that can be any of a surveillance system, a face detection system, a face recognition system, a cancer detection system, an object tracking system, an Advanced Driver-Assistance System (ADAS), and so forth. Actions capable of being performed by the other system 220 are described below with respect to block 335 of method 300 of FIG. 3.

It is to be appreciated that the other system 220 is not limited to solely those mentioned herein and, thus, the present invention can be incorporated into other types of systems that can use object localization and/or object classification, while maintaining the spirit of the present invention.

Figure 3:
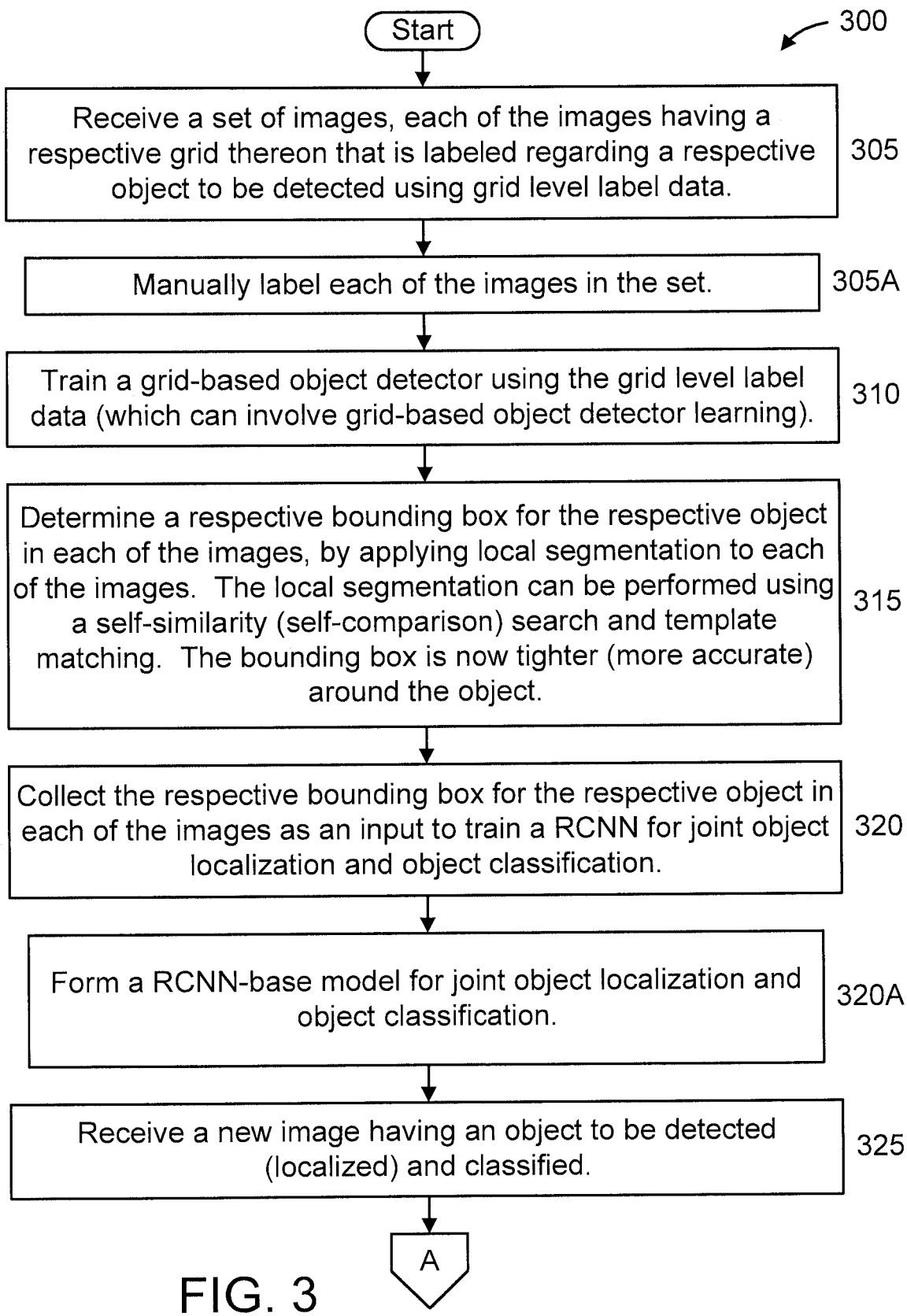
FIGS. 3-4 are flow diagrams showing an exemplary method for a self-guided object detection in regular images, in accordance with an embodiment of the present invention.
Figure 4:
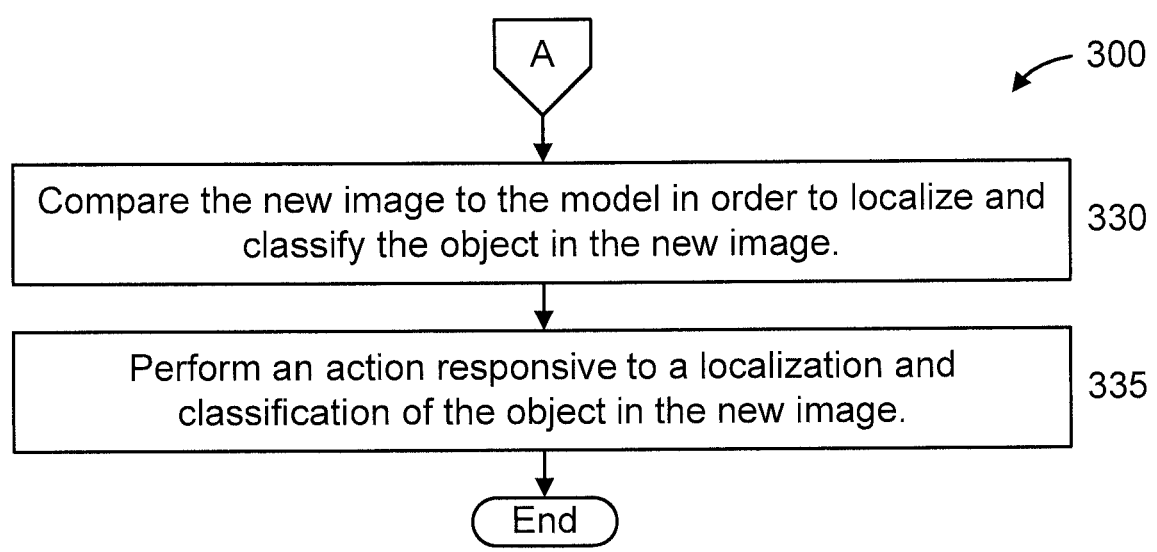
Figure 5:
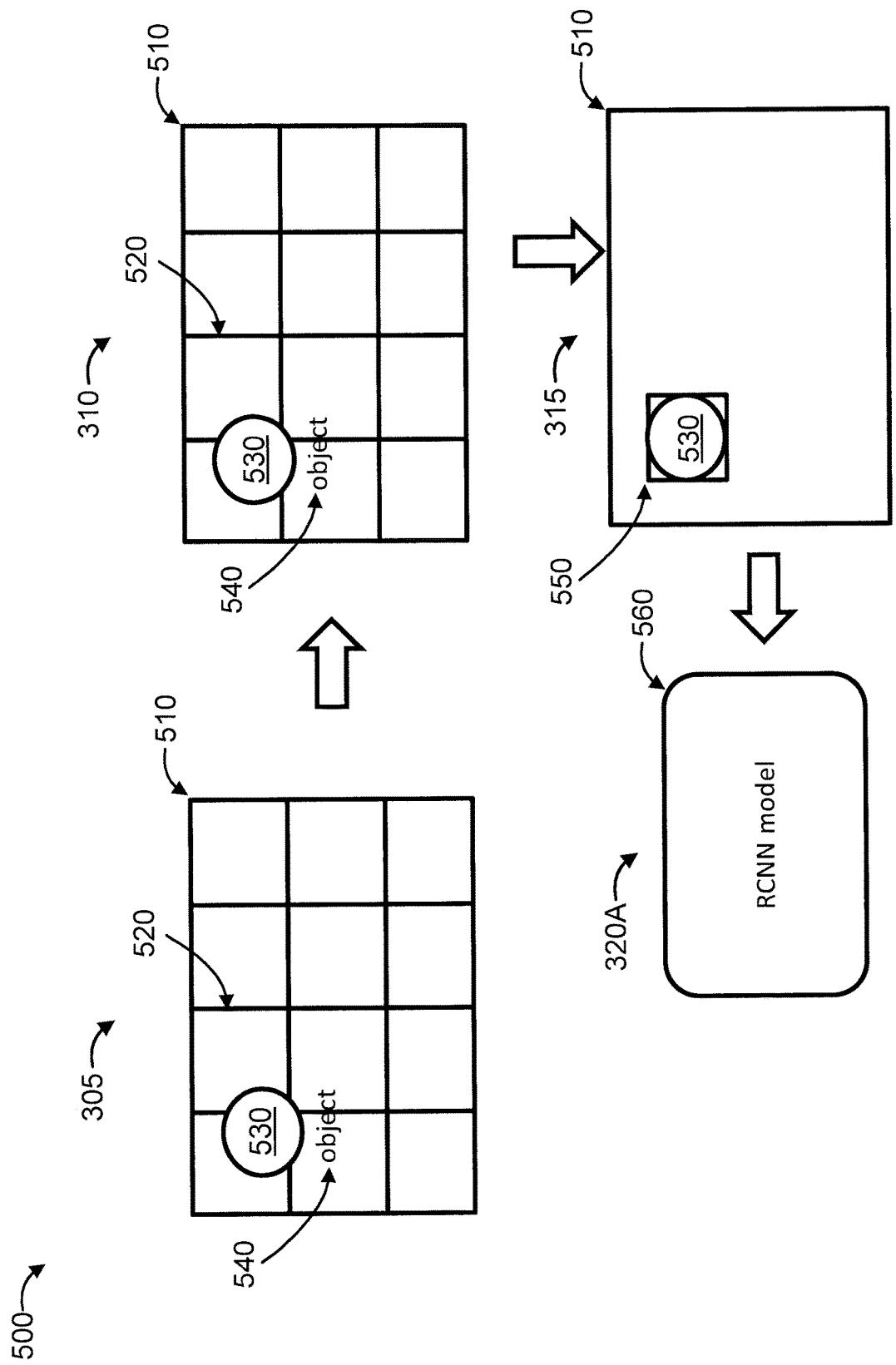
FIG. 5 is a block diagram graphically illustrating various steps of the method of FIGS. 3-4, in accordance with an embodiment of the present invention.

FIGS. 3-4 are flow diagrams showing an exemplary method 300 for a self-guided object detection in regular images, in accordance with an embodiment of the present invention. FIG. 5 is a block diagram graphically illustrating various steps of the method 300 of FIGS. 3-4, in accordance with an embodiment of the present invention. The graphic illustration shown in FIG. 5 is directed to processing a single image for the purposes of training, i.e., before the inference stage. However, as noted by the specific steps of method 300, the same readily and preferably applies to a set of images for the purpose of training a RCNN to localize and classify objects in regular images. The trained RCNN can then be used in an inference stage on a new image in order to localize and classify an object in the new image.

Referring to FIGS. 3-5, at block 305, receive a set of images, each of the images (e.g., image 510) having a respective grid (e.g., grid 520 on image 510) thereon that is labeled (e.g., label="object") regarding a respective object (e.g., object 530) to be detected using grid level label data (e.g., label 540). The grid level label data can include a simply label of "target" for the target object to be localized and classified.

In an embodiment, block 305 can include block 305A.

At block 305A, manually label each of the images in the set (as this manual labeling task is simple and quick to perform). For example, it is noted that the detection of whether an object is at a particular location or not is significantly easier than finding its' exact bounding box. The labeling at this block can be considered rough labeling in that the accuracy of the bounding box is not as precise as in later blocks.

At block 310, train a grid-based object detector using the grid level label data. In an embodiment, block 310 can involve grid-based object detector learning. It is emphasized that the automatic detection performed relative to block 310 is at the grid-level and not at the pixel-level. Hence, the detection will identify corresponding grids at least partially occupied by the object.

At block 315, determine a respective bounding box for the respective object in each of the images, by applying local segmentation to each of the images. In an embodiment, the local segmentation can be performed using a self-similarity (self-comparison) search and template matching. The bounding box is now tighter (more accurate) around the object.

At block 320, collect the respective bounding box (e.g., bounding box 550 for object 530) for the respective object in each of the images as an input to train a RCNN for joint object localization and object classification. The existing fast RCNN can be used, or some other type of neural network. That is, the present invention can be used with other types of artificial learning mechanism including other types of neural networks, while maintaining the spirit of the present invention.

In an embodiment, block 320 can include block 320A.

At block 320A, form a RCNN-based model 560 for joint object localization and object classification.

At block 325, receive a new image having an object to be detected (localized) and classified.

At block 330, compare the new image to the model in order to localize and classify the object in the new image.

At block 335, perform an action responsive to a localization and classification of the object in the new image. As is apparent to one of ordinary skill in the art, the action depends upon the implementation. As noted above, the present invention can be used along with or as part of a surveillance system, a face detection system, a face recognition system, a cancer detection system, an object tracking system, an Advanced Driver-Assistance System (ADAS). Hence, in the case of a surveillance system, the action can be automatically locking a door or an object to prevent access, and so forth. In the cases of a face detection system and a face recognition system, the same can be used accordingly, or can be used as part of a surveillance system in order to detect people in a restricted environment and identify the people to determine if they are authorized to be there. In the case of a cancer detection system, the same can be used to detect various types of cancer, based on localization and classification of the cancer. In the case of an object tracking system, the same can be used to track sports objects such as footballs, hockey pucks, soccer balls, tennis balls, and so forth while they are in play. Moreover, the same can be incorporated into an ADAS to detect obstacles relative to a moving vehicle. In such a case, the action can involve any of braking, steering, accelerating and so forth in order to avoid a detected object/obstacle. Moreover, in an embodiment, the action can involve acoustically announcing the location and/or the classification of an object over a speaker in order to inform a user of the same. These and other actions that can be performed by block 335 are readily determined by one of ordinary skill in the art, given the teachings of the present invention provided herein, while maintaining the spirit of the present invention.

Further regarding block 315 and self-similarity, the same involves identifying a self-similar object that is exactly or approximately similar to a part of itself.

Further regarding block 315 and template matching, the same involves identifying a portion(s) of an image matching a template image. The template image can itself be a portion of an image. In an embodiment, the template matching can involve using templates that match the object under varying conditions (e.g., occlusions, lighting, etc.). These and other variations of a template matching process can be used in accordance with the teachings of the present invention, while maintaining the spirit of the present invention.

Figure 6:
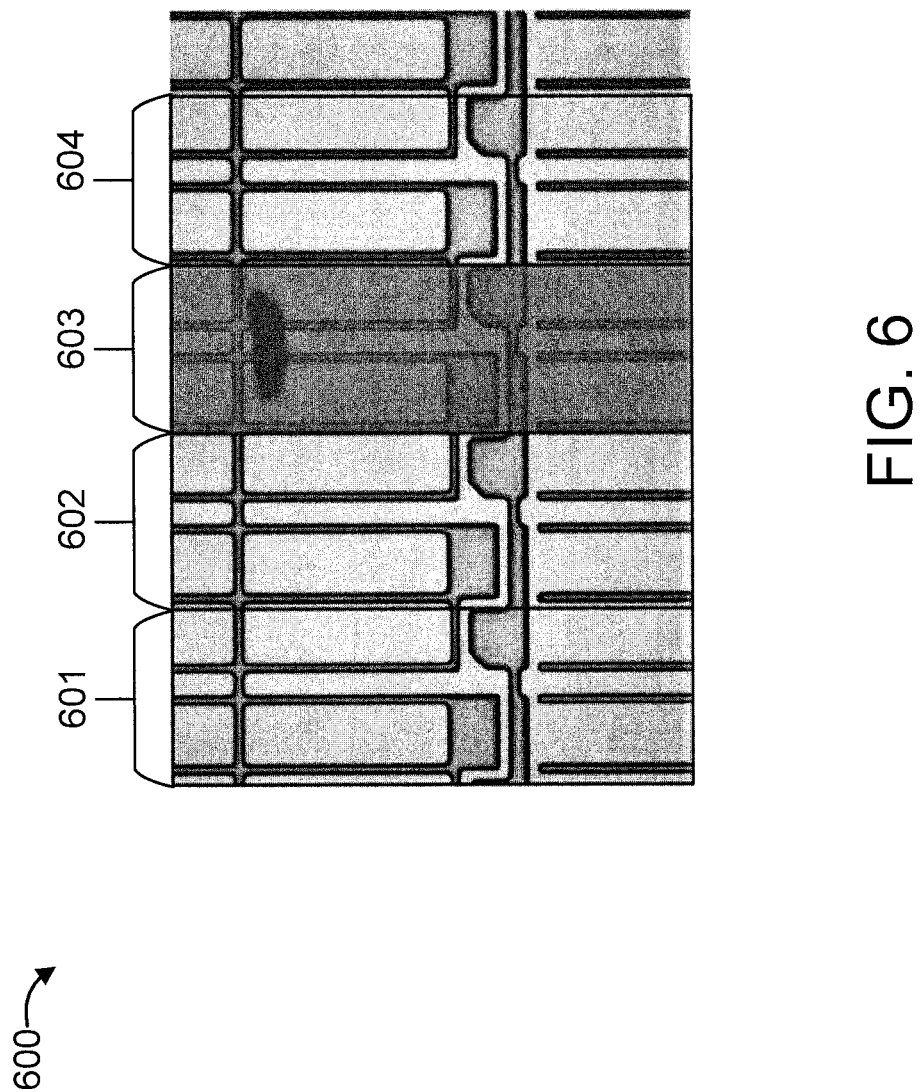
FIG. 6 is a block diagram showing an exemplary test image from a real TFT-LCD manufacturing line, to which the present invention can be applied, in accordance with an embodiment of the present invention.

Hence, in block 315, self-similarity and template matching are used. A description will now be given regarding the use of self-similarity and template matching. As the raw images have no defect bounding box annotation, the raw images are not ready for the direct application of conventional detection approaches such as, for example, R-CNN, and so forth. FIG. 6 is a block diagram showing an exemplary test image 600 from a real TFT-LCD manufacturing line, to which the present invention can be applied, in accordance with an embodiment of the present invention. As shown in FIG. 6, there are many rectangle regions on a Liquid Crystal Display (LCD) panel which have been referred to as pixel regions (PRs). Here, an important observation is made about the specific periodic textures of LCD images as illustrated in FIG. 6 with four periods in the horizontal direction, as follows: a clean period 601; a clean period 602; a dirty period 603; and a clean period 604. The dirty period 603 is a corrupted period with a defect, and the clean periods 601, 602, and 604 are non-corrupted periods without defects.

Figure 7:
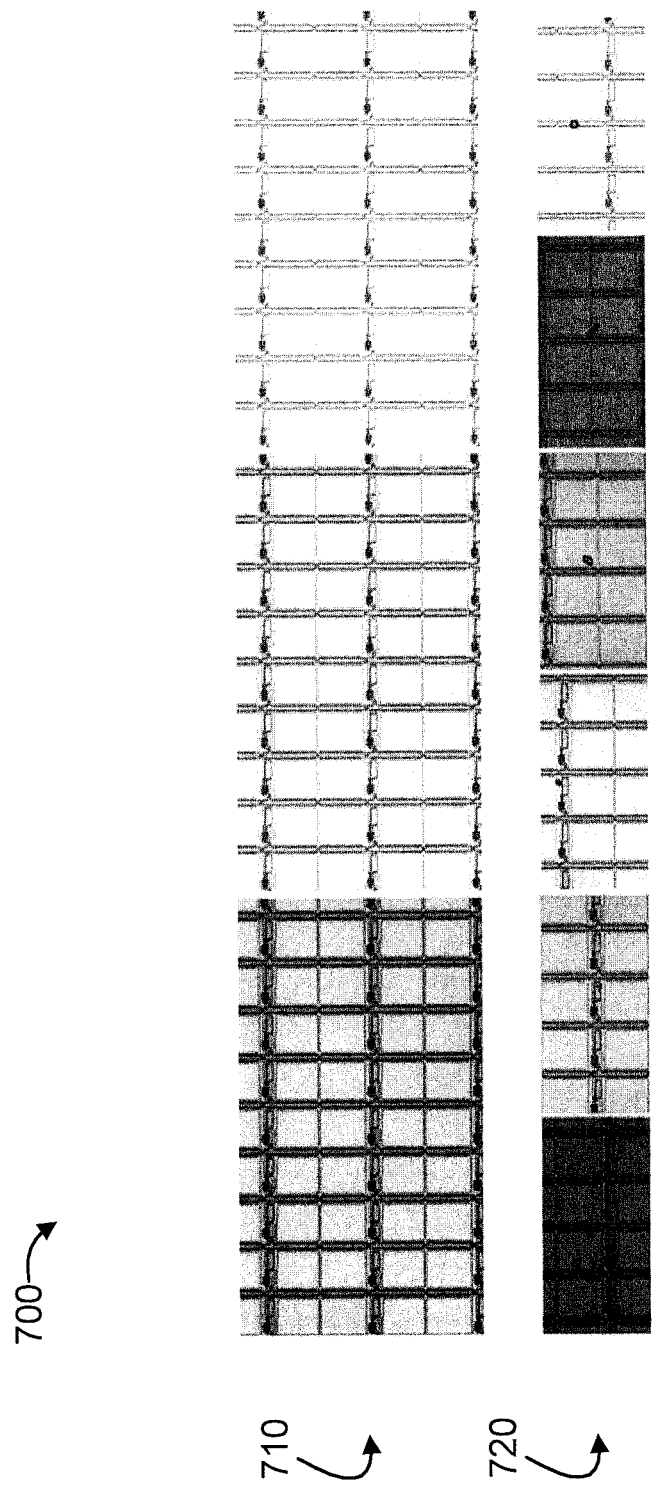
FIG. 7 is a block diagram showing exemplary templates and test images to which the present invention can be applied, in accordance with an embodiment of the present invention.

FIG. 7 is a block diagram showing exemplary templates 710 and test images 720 to which the present invention can be applied, in accordance with an embodiment of the present invention. The templates 710 and the test images 720 have varying illumination. The pattern of the test images 720 allow for the designing of a method to extract the self-reference template and extract the defect as outliers accordingly. The technical highlight is that instead of matching an offline-collected template image as a reference, which is usually very sensitive to illumination change and generates many false alarms, we turn to an adaptive technique by generating an online template from the testing image. For the proposed period based defect localization pipeline, each of the involved steps are shown in FIG. 8.

Figure 8:
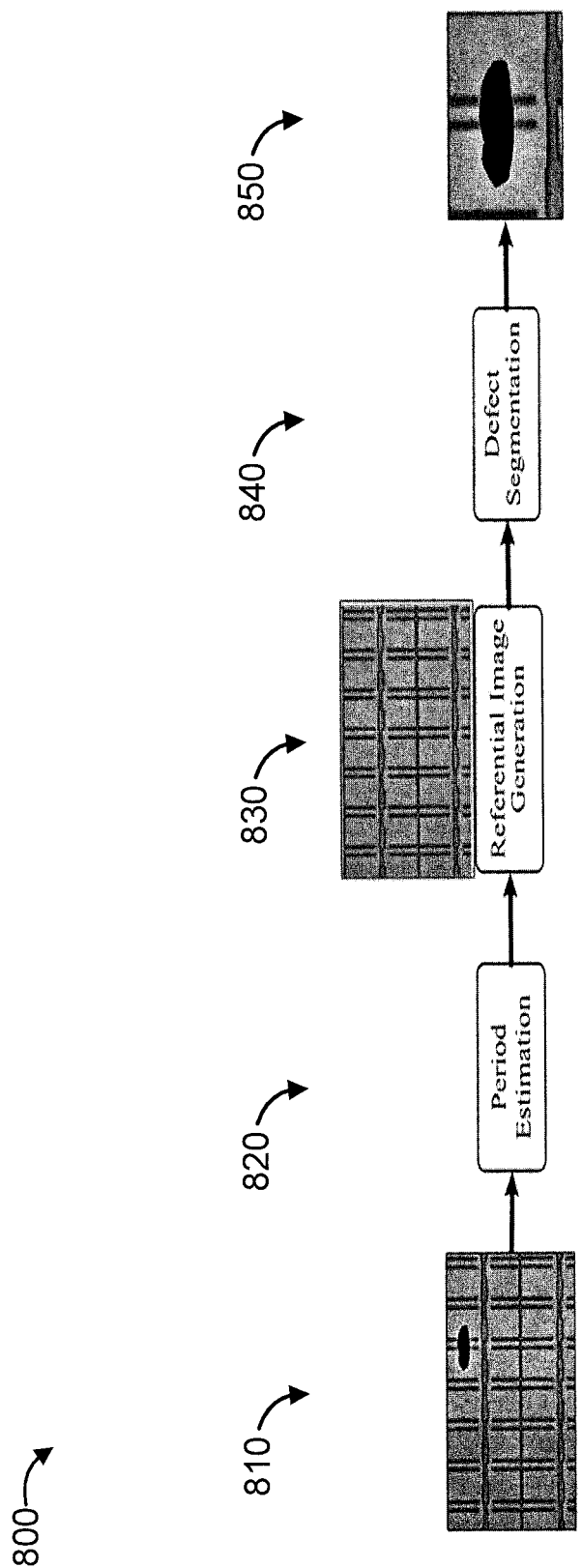
FIG. 8 is a block diagram showing an exemplary self-reference based defect localization procedure, in accordance with an embodiment of the present invention.

FIG. 8 is a block diagram showing an exemplary self-reference based defect localization procedure 800, in accordance with an embodiment of the present invention.

At block 810, receive an input test image.

At block 820, perform period estimation on the test image.

At block 830, perform referential image generation.

At block 840, perform defect segmentation.

At block 850, output the defect. In an embodiment, a corrected image with the defect removed can be shown. These and other implementation are readily determined by one of ordinary skill in the art given the teachings of the present invention provided herein, while maintaining the spirit of the present invention.

In an embodiment, method 300 can be provided as a cloud service in order to provide cloud-based object localization and classification. In this way, image processing overhead can be offloaded to the cloud. The service could further offer actions that can be performed depending upon the results of the object localization and classification. These and other implementations of method 300, including cloud and non-cloud-based implementations, are readily determined by one of ordinary skill in the art, given the teachings of the present invention provided herein, while maintaining the spirit of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
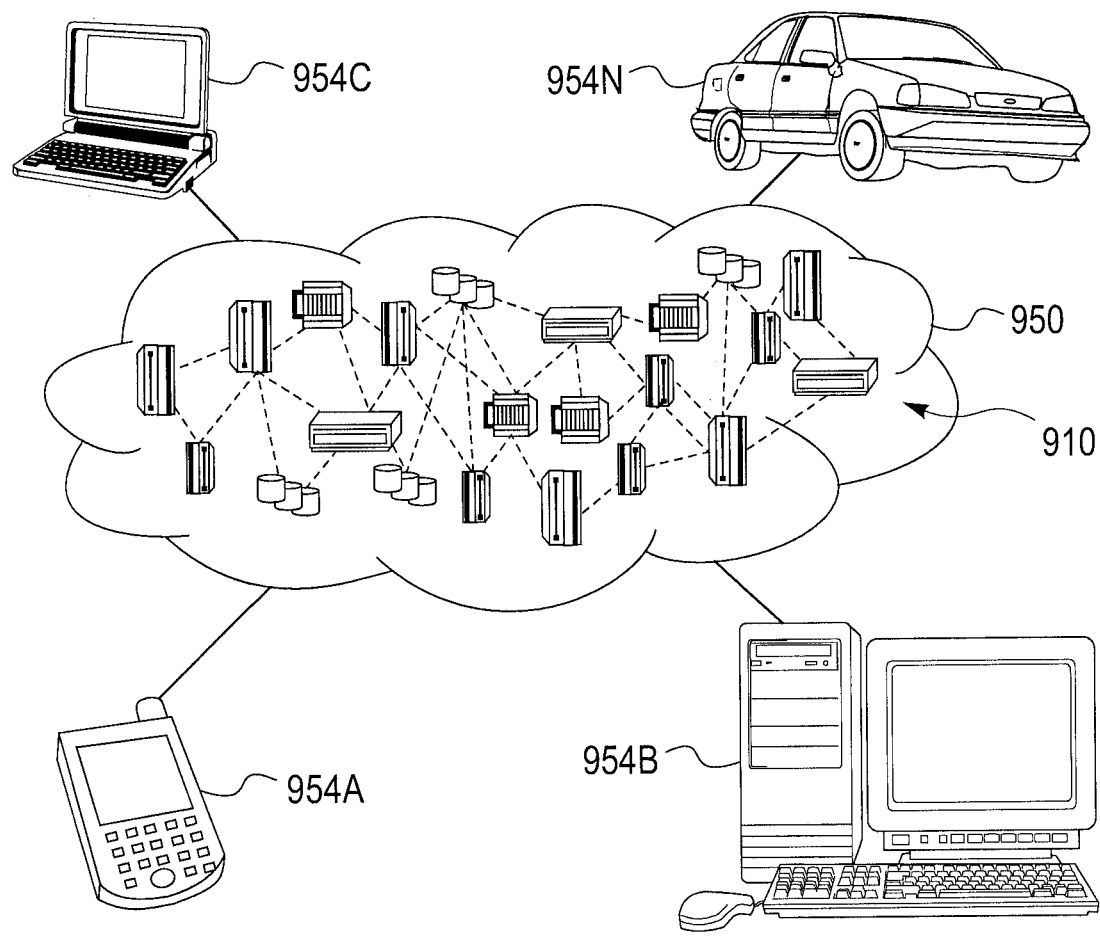
FIG. 9 is a block diagram showing an illustrative cloud computing environment having one or more cloud computing nodes with which local computing devices used by cloud consumers communicate, in accordance with an embodiment of the present invention.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
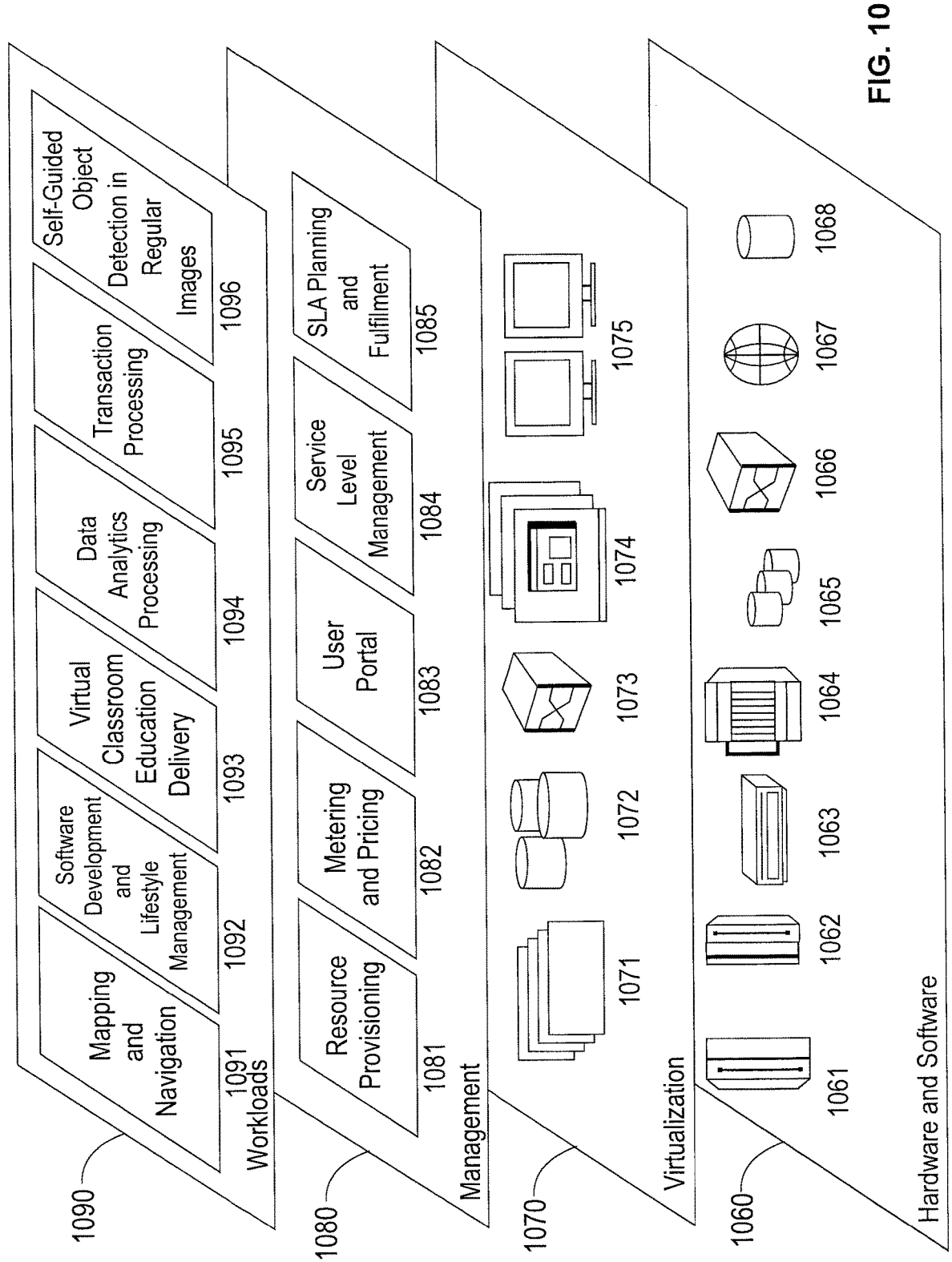
FIG. 10 is a block diagram showing a set of functional abstraction layers provided by a cloud computing environment, in accordance with an embodiment of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and self-guided object detection in regular images 1096.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for image-based, self-guided object detection, comprising:
   receiving, by a processor device, a set of input training images, each of the input training images having a respective grid thereon formed from a plurality of pixels that is labeled using a single label as grid level label data regarding a respective object to be detected;
   training, by the processor device, a grid-based object detector using the grid level label data;
   determining, by the processor device, a respective bounding box for the respective object in each of the input training images, by applying local segmentation to each of the input training images; and
   training, by the processor device, a Region-based Convolutional Neural Network (RCNN) for joint object localization and object classification using the respective bounding box for the respective object in each of the input training images as an input to the RCNN.

2. The computer-implemented method of claim 1, further comprising performing an action responsive to the object localization and object classification for a respective new object in a new image to which the RCNN is applied.

3. The computer-implemented method of claim 2, wherein the action comprises autonomously controlling a motor vehicle to avoid a collision with the new object responsive to the object localization and object classification for the respective new object.

4. The computer-implemented method of claim 1, wherein the local segmentation is performed using a self-similarity search and template matching to provide the respective bounding box around the respective object in the set of input training images.

5. The computer-implemented method of claim 1, wherein the local segmentation is applied to each of the input training images to segment a respective target region therein.

6. The computer-implemented method of claim 1, wherein the Region-based Convolutional Neural Network (RCNN) forms a model during an object training stage that is to detect objects in new images during an inference stage.

7. The computer-implemented method of claim 1, wherein the method is performed by a system selected from the group consisting of a surveillance system, a face detection system, a face recognition system, a cancer detection system, an object tracking system, and an Advanced Driver-Assistance System.

8. The computer-implemented method of claim 1, wherein the respective bounding box is determined by the local segmentation being performed using a self-similarity search and template matching approach to fit the bounding box around the respective object.

9. A computer program product for image-based, self-guided object detection, the computer program product comprising a non-transitory computer readable storage medium having program instructions embodied therewith, the program instructions executable by a computer to cause the computer to perform a method comprising:
   receiving, by a processor device, a set of input training images, each of the input training images having a respective grid thereon formed from a plurality of pixels that is labeled using a single label as grid level label data regarding a respective object to be detected;
   training, by the processor device, a grid-based object detector using the grid level label data;
   determining, by the processor device, a respective bounding box for the respective object in each of the input training images, by applying local segmentation to each of the input training images; and
   training, by the processor device, a Region-based Convolutional Neural Network (RCNN) for joint object localization and object classification using the respective bounding box for the respective object in each of the input training images as an input to the RCNN.

10. The computer program product of claim 9, wherein the method further comprises performing an action responsive to the object localization and object classification for a respective new object in a new image to which the RCNN is applied.

11. The computer program product of claim 10, wherein the action comprises autonomously controlling a motor vehicle to avoid a collision with the new object responsive to the object localization and object classification for the respective new object.

12. The computer program product of claim 9, wherein the local segmentation is performed using a self-similarity search and template matching to provide the respective bounding box around the respective object in the set of input training images.

13. The computer program product of claim 9, wherein the local segmentation is applied to each of the input training images to segment a respective target region therein.

14. The computer program product of claim 9, wherein the Region-based Convolutional Neural Network (RCNN) forms a model during an object training stage that is to detect objects in new images during an inference stage.

15. The computer program product of claim 9, wherein the method is performed by a system selected from the group consisting of a surveillance system, a face detection system, a face recognition system, a cancer detection system, an object tracking system, and an Advanced Driver-Assistance System.

16. A computer processing system for image-based, self-guided object detection, comprising:
    a memory device for storing program code; and
    a processor device for running the program code to receive a set of input training images, each of the input training images having a respective grid thereon formed from a plurality of pixels that is labeled using a single label as grid level label data regarding a respective object to be detected;

train a grid-based object detector using the grid level label data;

determine a respective bounding box for the respective object in each of the input training images, by applying local segmentation to each of the images; and train a Region-based Convolutional Neural Network (RCNN) for joint object localization and object classification using the respective bounding box for the respective object in each of the input training images as an input to the RCNN.

17. The computer processing system of claim 16, wherein the processor device further runs the program code to perform an action responsive to the object localization and object classification for a respective new object in a new image to which the RCNN is applied.

18. The computer processing system of claim 17, wherein the action comprises autonomously controlling a motor vehicle to avoid a collision with the new object responsive to the object localization and object classification for the respective new object.

19. The computer processing system of claim 16, wherein the local segmentation is performed using a self-similarity search and template matching to provide the respective bounding box around the respective object in the set of input training images.

20. The computer processing system of claim 16, wherein the computer processing system is comprised in a system selected from the group consisting of a surveillance system, a face detection system, a face recognition system, a cancer detection system, an object tracking system, and an Advanced Driver-Assistance System.

* * * * *